United States Patent [19]

Brodersen

[11] Patent Number: 5,580,027
[45] Date of Patent: Dec. 3, 1996

[54] CABLE DRIVE MECHANICAL SEAT SUSPENSION

[75] Inventor: Cole T. Brodersen, Davenport, Iowa

[73] Assignee: Sears Manufacturing Company, Davenport, Iowa

[21] Appl. No.: 502,150

[22] Filed: Jun. 7, 1995

[51] Int. Cl.$^6$ ............................................. F16M 13/00
[52] U.S. Cl. .................... 248/564; 248/584; 248/162.1; 248/421; 248/280.11; 248/292.11
[58] Field of Search ................................. 248/584, 564, 248/162.1, 421, 280.11, 292.11

[56] References Cited

U.S. PATENT DOCUMENTS

| | | | |
|---|---|---|---|
| 4,072,287 | 2/1978 | Swenson et al. | 248/421 X |
| 4,448,386 | 5/1984 | Moorhouse et al. | 248/564 |
| 4,659,052 | 4/1987 | Nagata | 248/421 X |
| 4,856,763 | 8/1989 | Brodersen et al. | 248/564 X |
| 4,880,201 | 11/1989 | Hall et al. | 248/421 X |
| 4,943,037 | 7/1990 | Brodersen et al. | 248/421 X |
| 4,948,081 | 8/1990 | Hatta | 248/421 X |
| 4,981,085 | 1/1991 | Watt | 248/162.1 X |
| 5,364,060 | 11/1994 | Donavan et al. | 248/584 X |

FOREIGN PATENT DOCUMENTS 782871  4/1968  Canada .................................. 248/564

Primary Examiner—Peter M. Cuomo
Assistant Examiner—Stephen Vu
Attorney, Agent, or Firm—Niro, Scavone, Haller & Niro

[57] ABSTRACT

A vehicle seat suspension system is provided which includes, in a seat support comprising an upper housing and a lower housing and a scissors linkage support apparatus, a spring fixed to the upper housing and a cable attached to the spring and wrapping around a pulley attached to the upper housing and downwardly to an arcuate pulley attached at the scissors linkage midway pivot and an actuator knob which allows a seat occupant to tighten or loosen the cable and raise or lower the seat to provide a vehicle seat suspension system.

6 Claims, 3 Drawing Sheets

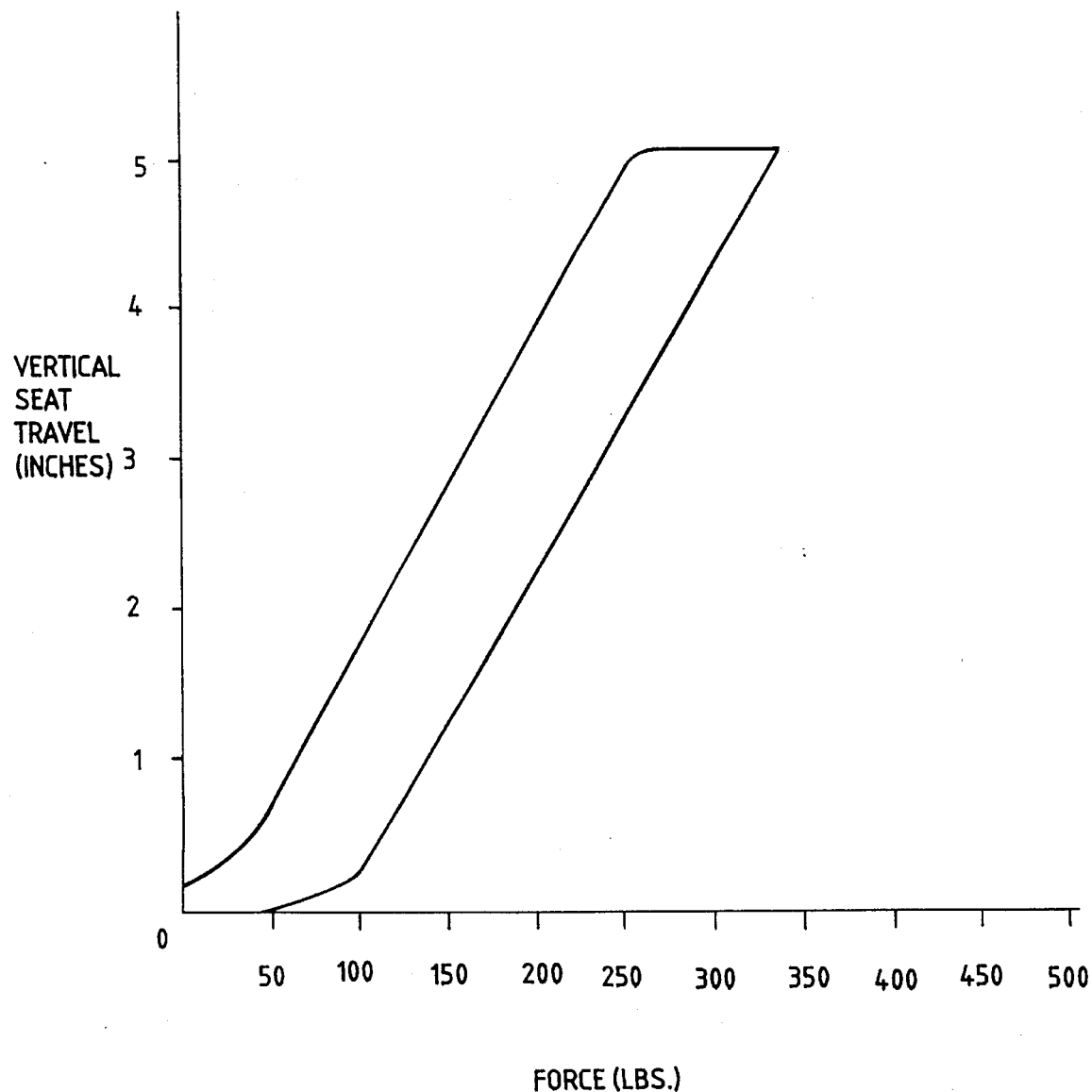

5,580,027

1
CABLE DRIVE MECHANICAL SEAT SUSPENSION

BACKGROUND OF THE INVENTION

The present invention relates generally to a mechanical, adjustable seat suspension device and, more specifically, to a cable drive mechanical seat suspension device which uses springs and a cable to allow a seat occupant to conveniently adjust the vertical position of a seat and which allows for a substantially linear force-versus-deflection curve.

There is a continuing need for suspension mechanisms that are simply constructed and inexpensive while still meeting manufacturers' ever increasing demands for compactness and comfort. An additional need exists for such a device whose suspension and ride characteristics can be easily modified. Other difficulties have been encountered in the height adjustment mechanisms of seat suspensions. Frequently such mechanisms are difficult to reach, require levers or triggers that can pinch an operator, and generally are complicated and expensive.

Most seat suspensions transmit the load from the seat to the suspension springs through steel bars comprising scissor arms or parallelogram linkages. Typical of these prior art device include the following U.S. Pat. No. 3,339,906 to Persson; U.S. Pat. No. 3,826,457 to Huot de Longcham; and U.S. Pat. No. 4,125,242 to Meiller et al. In such systems, the forces exerted on the suspension system by the seat occupant may be carried by a cam and a roller bearing. An example of such a system is described in U.S. Pat. No. 5,125,631 to Brodersen et al. Such systems are efficient and advantageous in that they allow substantial vertical seat adjustment and suspension. A disadvantage with such systems is that a substantial force is exerted on an arcuate cam and a roller bearing and often in a single-point contact relationship. This force requires hardened metal surfaces and durable components which can be expensive. Point-to-point surface contact also increases the difficulty of achieving a dependable, consistent linear relationship between suspension force and vertical deflection due to "noise" between contacting surfaces. It would thus be highly desirable for a seat suspension to provide maximum height adjustment and compactness while also being economical and providing a desired force-deflection linear relationship.

SUMMARY OF THE INVENTION

The present invention provides an economical, compact and conveniently actuated seat suspension having many of the functional characteristics required for use in a heavy duty vehicle. It uses springs, a cable drive system, an idler pulley, and a drive pulley in conjunction with a scissors linkage seat suspension. The present invention thus provides economical, dependable and convenient mechanical seat adjustment and support while also providing a damping means and exhibits a linear relationship between the vertical movement of the seat and the force exerted on the suspension system. A linear relationship is important in a seat suspension to ensure that, throughout the distance traveled by the seat, a linearly related suspension force is exerted by the suspension system. This linear relationship provides the same level of comfort and shock absorption, or "feel", to the seat occupant as the seat travels vertically.

The present invention provides a suspension assembly in conjunction with a scissors linkage system using a cable and spring and pulley which allow convenient and reliable seat adjustment and suspension in an economical apparatus.

2

Another object of the present invention is to provide a mechanical, adjustable seat suspension system which provides full vertical adjustability, is economical to manufacture, and which also provides a linear relationship between vertical suspension deflection and force exerted on the suspension system.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 4 is a graphic representation of the force/deflection characteristics of the present invention showing vertical distance traveled by the seat on the y-axis and the corresponding force exerted on the suspension on the x-axis.

DETAILED DESCRIPTION OF THE PREFERRED EMBODIMENT

Figure 1:
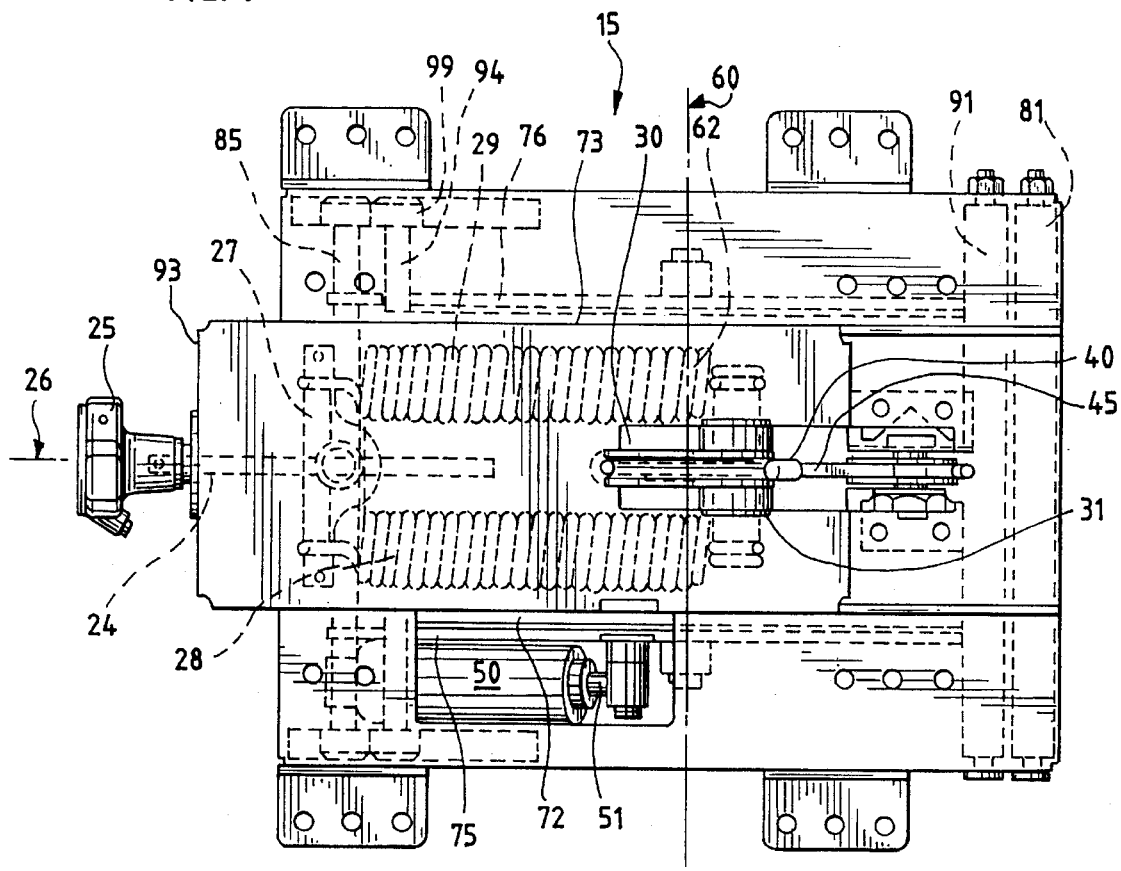
FIG. 1 is a plan view of a preferred embodiment of the present invention.
Figure 2:
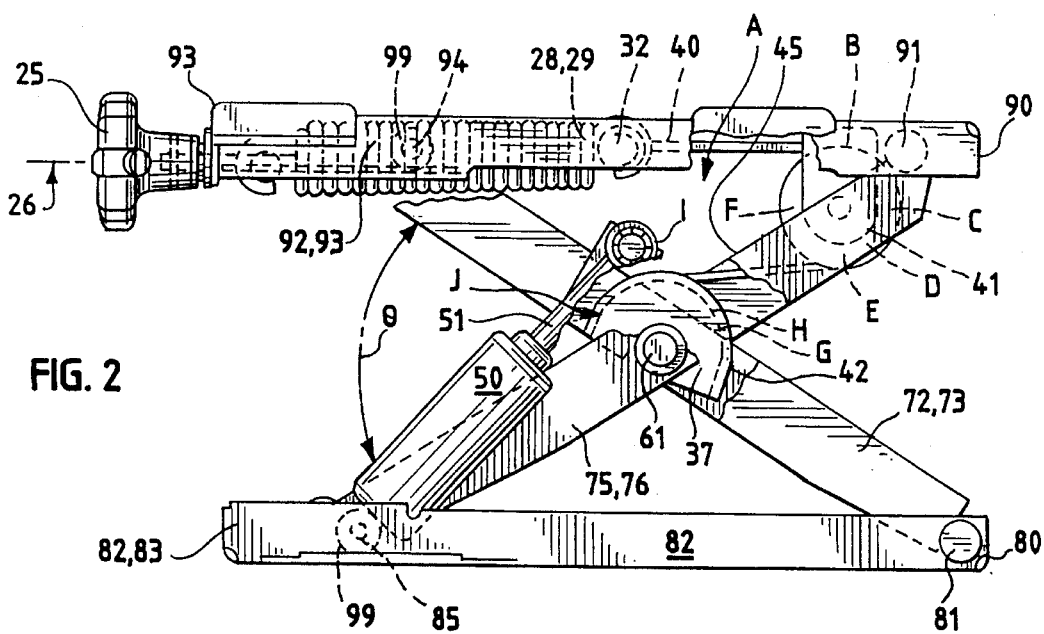
FIG. 2 is a side view of the preferred embodiment of the present invention illustrated in FIG. 1.
Figure 3A:
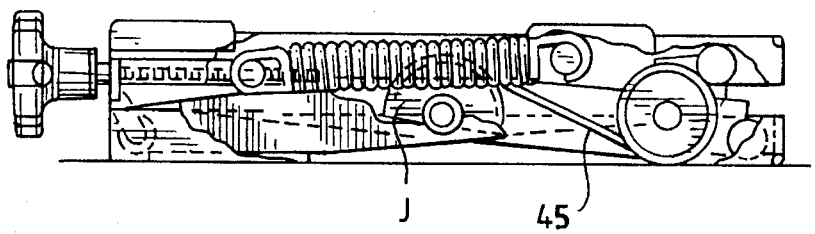
FIGS. 3A through 3D are sequential side views showing the operation of the preferred embodiment of the present invention.
Figure 3B:
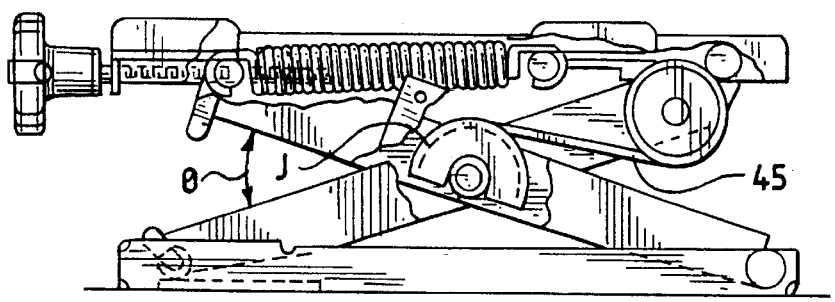
Figure 3C:
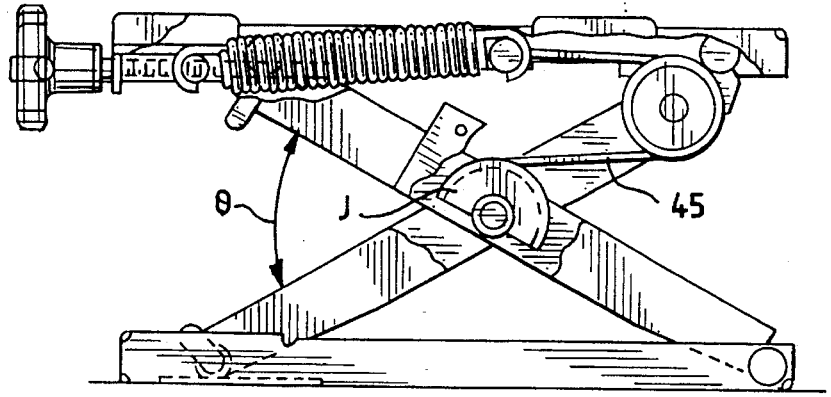
Figure 3D:
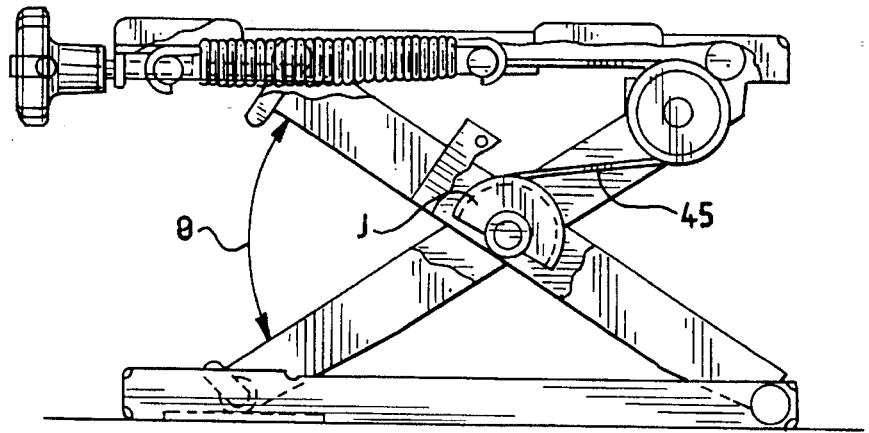

The preferred embodiment of the present invention, as shown in FIGS. 1 and 2 and designated generally 15, utilizes a scissors linkage support assembly well known in the art. In conjunction with the support assembly, the suspension system utilizes actuator knob 25 rotatably mounted on front 93 of upper housing member 90, front spring bar 27 operatively attached to coil springs 28, 29, rear spring bar 32, cable holder 40, cable 45, guide 31, idler pulley wheel 41, drive pulley 37, pivot axle 61, and shock absorber 50.

As is well known in the prior art, scissors linkage support assemblies work to provide seat height adjustment in the following general manner. An upper housing 90 and a lower housing 80 each includes flanges 82 around the perimeter thereof. Toward the rear of each is an axle 81, 91. Attached to lower housing axle 81 and extending outwardly therefrom are parallel linkage arms 72, 73. Linkage arms 72, 73 extend upward and terminate at upper guide bar 94. Upper guide bar 94 extends across upper housing 90. At either end of upper guide bar 94 are rotatably attached rollers 99. Rollers 96 of upper guide bar 94 are slidably disposed within upper linkage tracks 92, 93 formed with flanges 82 of upper housing 90.

Attached to upper housing axle 91 are parallel linkage arms 75, 76. Linkage arms 75, 76 extend downwardly from axle 91 and terminate at lower guide bar 85. Lower guide bar 85 extends across lower housing 80. At either end of lower guide bar 85 are rotatably attached rollers 99. Rollers 99 of lower guide bar 85 are slidably disposed within lower linkage tracks 82, 83 formed within flanges 82 of lower housing 80.

Linkage arms 72, 73 cross inside of and adjacent linkage arms 75, 76 to form a cross pivot axis 60. Linkage arms 75, 76 and 72, 73 are axially connected through cross pivot axis 60 with linkage axle 61. Integrally and coaxially connecting linkage arms 72, 73 is linkage axle housing 62.

Pivotally attached to lower guide bar 85 is the stationary portion of shock absorber 50. Extending upward from lower guide bar 85, piston 51 of shock absorber 50 is pivotally connected to linkage arm 72 or 73 above axis 60. As will be apparent to those of ordinary skill in the art, this scissors linkage assembly works to provide height adjustment of upper housing 90 relative to lower housing 80. When upper housing 90 is in its lowest position, angle $\Theta$ is minimized. As linkage arms 72, 73 and 75, 76 work to provide a mechanical linkage as upper housing 90 is raised relative to lower housing 80, angle $\Theta$ increases. As is well known to those of ordinary skill in the art, scissors linkage assemblies vary significantly and are not limited herein to the specific embodiment just described. Any similar scissors linkage assembly will suffice for the purposes of the present invention.

The present invention utilizes a cable suspension assembly in conjunction with a scissors linkage support assembly to provide seat vertical adjustability and suspension. The present invention employs, between the upper and lower housings, to vary the spacial relationship therebetween, at least one spring, an arcuate cam mounted to the suspension linkage, and a cable operatively connecting the spring and cam such that vertical movement of the upper housing is translated to rotational movement of the cam and wherein the cam and spring cooperate to provide seat suspension to a seat occupant.

Operatively, rotatably attached to the front 93 of upper housing 90 is knob 25 and threaded member 24 forming knob axis 26. Attached to member 24 is laterally extending front spring bar 27. Upper housing 90 includes a slot 30 which houses guide 31. Depending from guide 31 is rear spring bar 32. Extending between rear spring bar 32 and front spring bar 27 along either side of knob axis 26 are springs 28 and 29. Cable 45 extends rearward from rear spring bar 32 to pulley wheel 41 which is secured to upper housing 90. (See FIG. 2).

Cable 45 extends around and down from wheel 41 to drive pulley 37 and is fixedly secured thereto. Arcuate cam 37 is an integral part of axle housing 62 between linkage arms 72, 73 and has around its arcuate perimeter annular cable-receiving recess 42. Arcuate cam 37 can be substantially semi-circular (as shown in the drawings) with its flat edge substantially along the line defined by linkage arms 72, 73 and its arcuate periphery extending upwardly therefrom (Of course, drive pulley 37 may also form a circular pulley). Thus, as is shown in FIG. 2, cable 45 travels the path between points A and J.

As illustrated in FIG. 3, suspension assembly 15 works to provide seat suspension and vertical adjustability in the following manner. When upper housing 90 is in its lowermost position, linkage arms 72, 73 and 75, 76 are substantially horizontal, angle $\Theta$ being minimized. (FIG. 3A) As such, the path defined by the length of springs 28, 29 and cable 45 in the path extending over pulley wheel 41 to and substantially around drive pulley 37 is maximized. This position results when knob 25 is rotated to place front spring bar 27 in its most rearward position thus allowing cable 45 to extend fully through the path from point A to point J. As knob 25 is rotated, causing front spring bar 27 to be moved forward, springs 28, 29 are pulled forward causing rear spring bar 32 to be pulled forward. (FIG. 3B) Causing rear spring bar 32 to be pulled forward pulls cable 45 forward. Pulling cable 45 forward creates an upward rotational force on drive pulley 37 which causes linkage arms 72, 73 to rise. Raising linkage arms 72, 73 operates to actuate the scissors linkage support assembly to raise upper housing 90. Continuing to similarly operate knob 25 continues to cause upper housing 90 to be raised. (FIGS. 3B, 3C) Operating knob 25 in the opposite direction causes front spring bar 27 to move toward rear spring bar 32 which allows upper housing 90 to descend. (FIGS. 3C, 3D)

It will, thus, be appreciated that, as knob 25 is actuated to pull cable 45 forward, angle $\Theta$ will increase. As this occurs, drive pulley 37 rotates in a clockwise direction as depicted in FIG. 3. As drive pulley 37 rotates with linkage arms 72, 73, displacement of cable 45 between pulley wheel 41 and drive pulley 37 varies. Operating knob 25 thus works to rotate point J of arcuate cam 37 upward and toward pulley wheel 41 which causes linkage axle housing 62 and linkage members 72, 73 and 75, 76 to be raised.

Springs 28, 29 in conjunction with cable 45, pulley wheel 41, and drive pulley 37 provide suspension for the seat occupant as the seat is adjusted vertically. Springs 28, 29 provide equal and adequate tension to cable 45 to provide a range of comfortable suspension for a seat occupant. Springs 28, 29 offer the most adequate suspension support when the vertical deflection distance is linearly related to the force exerted on the suspension, as shown in FIG. 4. As will be appreciated by those of ordinary skill in the art, springs 28, 29 may be varied to provide differing tension strengths and length to provide a suspension assembly for varying seat heights and weights. Similarly, the radius and location of pulley wheel 41 and drive pulley 37 can be varied to provide suspension systems of variable height and weight adjustment parameters. Additionally, it is highly preferable to achieving the force/deflection linear relationship to use springs 28, 29 which have a 3:1 spring stretch to suspension travel ratio.

It will also be appreciated from the foregoing description and FIGURES that pulley wheel 41 may be manufactured of inexpensive materials such as plastic. This is so because cable 45 is generally contacting approximately 180° or more of pulley wheel 41. (FIG. 3) As such, the loads associated with the suspension are well-dispersed along a substantial length of the circumferential surface of pulley wheel 41. This allows wheel 41 to be constructed of material less expensive than the hardened metal surfaces of prior art suspension devices.

What is claimed is:

1. A vehicle seat suspension comprising:

an upper housing carrying a seat and a lower housing, the housings being joined by a linkage assembly permitting variation of the spacial relationship therebetween;

at least one extendable spring mounted to one of said housings;

an arcuate cable-engaging pulley mounted to said linkage assembly such that movement of said linkage assembly and variation in the spacial relationship of said housings result in the rotation of said arcuate pulley;

a cable having one end connected to said spring and the other end connected to said arcuate pulley;

said spring and said arcuate pulley together cooperating with said linkage assembly to provide the suspension with a substantially linear relationship between the force applied to the suspension and vertical moment of a seat.

2. The vehicle seat suspension of claim 1 further comprising:

an actuator attached to said upper housing operatively attached to a threaded member;

at least one said spring having opposite ends and being operatively connected to said threaded member at one end;

a guide slidably disposed within a slot in upper housing and depending from said upper housing;

at least one said spring connected to said guide at an end opposite said end connected to said threaded member;

such that operation of said actuator causes movement of said cable to adjust the height of said upper housing.

3. The vehicle seat suspension of claim 1 further comprising:

a pulley wheel operatively mounted to one of the housings between at least one said spring and said arcuate pulley such that said cable extends from said spring around said pulley wheel to said arcuate pulley.

4. The vehicle seat suspension of claim 1, wherein said arcuate pulley is semi-circular.

5. The vehicle seat suspension of claim 1, wherein said arcuate pulley is substantially circular.

6. The vehicle seat suspension of claim 1, wherein said linkage assembly includes a pivot axis, and said arcuate pulley is concentric about said pivot axis of said linkage assembly.

* * * * *

UNITED STATES PATENT AND TRADEMARK OFFICE
CERTIFICATE OF CORRECTION

PATENT NO. : 5,580,027
DATED : December 3, 1996
INVENTOR(S) : Cole Tom Brodersen It is certified that error appears in the above-indentified patent and that said Letters Patent is hereby corrected as shown below:

Column 4, line 66, insert -- "said" -- before "upper"--.

Signed and Sealed this

Eighth Day of April, 1997

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,580,027
DATED : 12/3/1996
INVENTOR(S) : Cole T. Brodersen

It is certified that error appears in the above-identified patent and that said Letters Patent is hereby corrected as shown below:

Claim 1, line 16, "moment" should read "movement"

Signed and Sealed this

Eleventh Day of November, 1997

BRUCE LEHMAN

*Attest:*

*Attesting Officer*     *Commissioner of Patents and Trademarks*